United States Patent [19]
Connolly, Jr.

[11] Patent Number: 5,559,756
[45] Date of Patent: Sep. 24, 1996

[54] ACOUSTIC INTERCEPT RECIEVER-COMBINED FREQUENCY AND BEARING PROCESSOR

[75] Inventor: George C. Connolly, Jr., Niantic, Conn.

[73] Assignee: The United States of America as represented by the Secretary of the Navy, Washington, D.C.

[21] Appl. No.: 167,056

[22] Filed: Jul. 19, 1971

[51] Int. Cl.$^6$ ........................................................ G01S 3/80
[52] U.S. Cl. ........................................... 367/125; 367/124
[58] Field of Search ................................ 340/6 R, 16 R; 343/113 R; 367/125, 124

[56] References Cited

U.S. PATENT DOCUMENTS 3,333,271   7/1967   Robinson et al. .................. 343/113 R
3,462,729   8/1969   Papineau et al. ........................ 340/6 R Primary Examiner—Ian J. Lobo
Attorney, Agent, or Firm—Michael J. McGowan; Prithvi C. Lall; Michael F. Oglo

[57] ABSTRACT

A signal processor for obtaining frequency and bearing information of an acoustical signal. Responsive to the acoustical signal, a multimode hydrophone generates a plurality of electrical signals which are combined to form a first omnidirectional signal and two spatially orthogonal directional signals. The directional signals are then combined to form a second omnidirectional signal. Additional circuitry is provided to analyze the two omnidirectional signals using the cross-spectral density function of the two omnidirectional signals to obtain said frequency and bearing information.

6 Claims, 3 Drawing Sheets

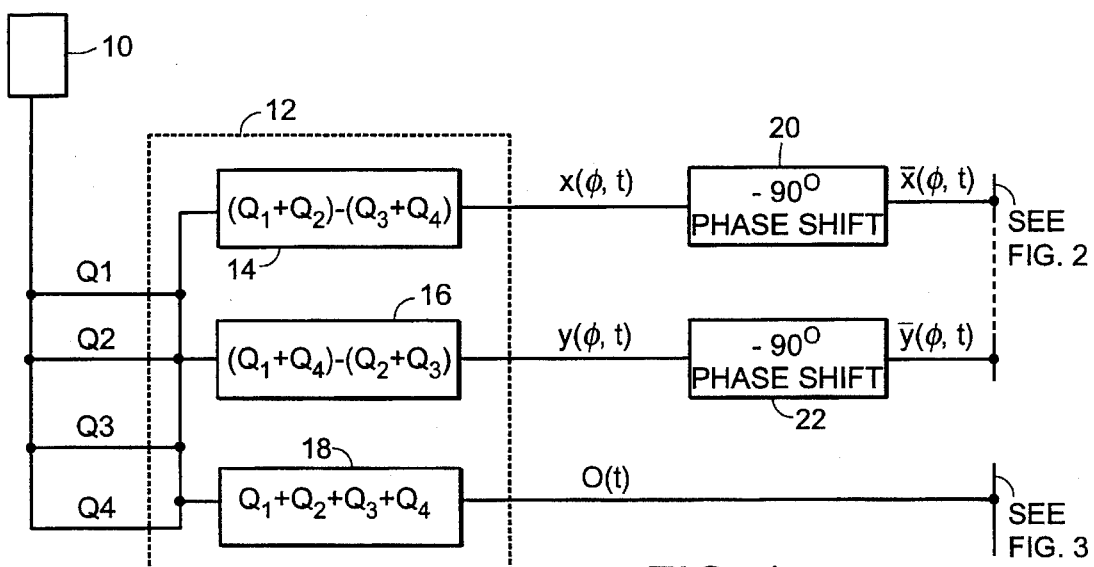
FIG. 1
(PRIOR ART)
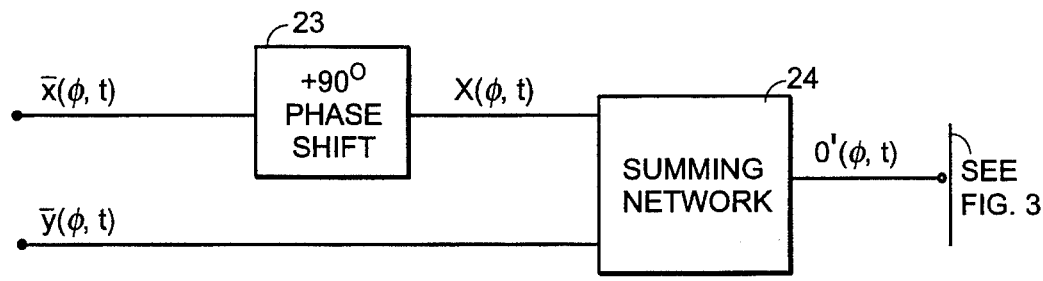
FIG. 2
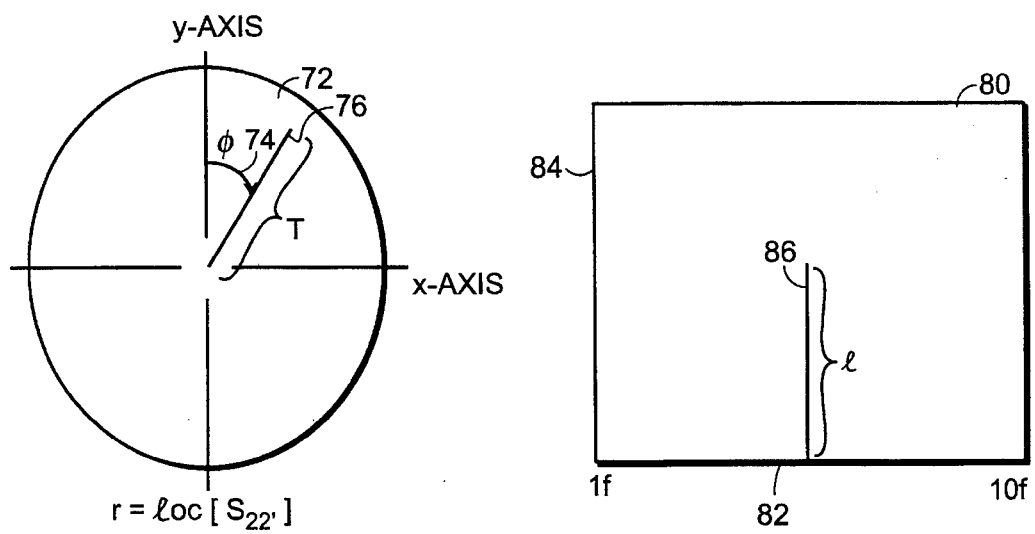
FIG. 5
BEARING DISPLAY
FIG. 6
FREQUENCY DISPLAY

ACOUSTIC INTERCEPT RECIEVER-COMBINED FREQUENCY AND BEARING PROCESSOR

BACKGROUND OF THE INVENTION

This invention relates to signal processors for extracting pertinent information about signals from a source in the presence of undesirable noise. More specifically, the invention relates to simultaneous extraction of bearing and frequency information of an acoustical signal in the presence of undesirable ambient noise.

Operational characteristics require that the prime functions of an acoustic intercept receiver are to detect, localize, and process or analyze all acoustic signals from active sonars operating in the vicinity of a submarine platform. Generally, localization comprises direction finding, i.e., determining the bearing or the angle of azimuth at which the intercepted signal arrives; and processing or analyzing, i.e., determining the frequency spectrum of the intercepted signal. The bearing and frequency information of the intercepted acoustic signal thus helps to pinpoint the movements of a moving body around a submarine. To date, all acoustic intercept receivers have used independent techniques for extracting the bearing information and the frequency information. One disadvantage of using such independent techniques is that the performance of each independent technique depends upon the characteristics of the intercepted signals and the ambient background noise. Consequently, it has been possible to obtain either the frequency information only or the bearing information only. One such attempt is discussed in U.S. Pat. No. 3,176,262 to Ehrlich et al, wherein a multimode sonar transducer, a right cylindrical hydrophone divided into four quadrants, generates four electrical signals, one signal from each quadrant, which can be represented as follows:

$$Q_1 = \frac{1}{4} [R(f) + jC(f)(+\cos\phi + \sin\phi)] \cdot S(\phi,t)$$

$$Q_2 = \frac{1}{4} [R(f) + jC(f)(-\cos\phi + \sin\phi)] \cdot S(\phi,t)$$

$$Q_3 = \frac{1}{4} [R(f) + jC(f)(-\cos\phi - \sin\phi)] \cdot S(\phi,t)$$

$$Q_4 = \frac{1}{4} [R(f) + jC(f)(+\cos\phi - \sin\phi)] \cdot S(\phi,t)$$

where $S(\phi,t)$ is the acoustic signal arriving from a source at a direction angle $\phi$, $R(f)$ is the omnidirectional receiving sensitivity, $C(f)$ is the circumferential receiving sensitivity, $S(\phi,t)$ is a time varying, plane-wave, acoustic signal from a source at a direction angle $\phi$, and $\phi$ is the direction angle, i.e., the angle of azimuth of the source of the acoustic signal.

These four signals are combined in a sum and difference network to obtain three signals:

$$x(\phi,t) = (Q_1 + Q_2) - (Q_3 + Q_4) = jC(f) \cdot \sin\phi \cdot S(\phi,t)$$

$$y(\phi,t) = (Q_1 + Q_4) - (Q_2 + Q_3) = jC(f) \cdot \cos\phi \cdot S(\phi,t)$$

$$O(t) = Q_1 + Q_2 + Q_3 + Q_4 = R(f) \cdot S(\phi,t)$$

These three signals have been processed to extract the bearing information as discussed in the Ehrlich et al patent.

Using the prior art methods, it has been possible to obtain either the frequency information only or the bearing information only.

SUMMARY OF THE INVENTION

The signal processor of this invention provides circuitry to obtain and display simultaneously the bearing and frequency information of an intercepted acoustic signal. A multimode hydrophone, a right cylindrical hydrophone divided into four quadrants, is used. Each quadrant of the hydrophone generates an electrical signal responsive to the intercepted acoustic signal. The four electrical signals thus obtained are combined in a circuitry provided therefor, to form one omnidirectional and two spatially orthogonal directional signals. Another omnidirectional signal is obtained by combining the two directional signals. Additional circuitry is provided to analyze the two omnidirectional signals by a method using the cross-spectral density function of the two omnidirectional signals. Such a method comprises modulating and filtering the two omnidirectional signals for a small bandwidth selection; phase shifting one of the signals; multiplying (a) the two filtered signals and (b) one filtered signal with the other filtered and phase shifted signal, averaging the products thereof; and displaying the result thereof to extract the bearing and frequency information simultaneously.

It is therefore the primary object of this invention to use a combined bearing and frequency processor to obtain simultaneously the bearing and frequency information of an intercepted acoustic signal.

Another object of the instant invention is to provide a single processor for extracting simultaneously the bearing and frequency information without equalizing $R(f)$ and $C(f)$.

Still another object of the subject invention is to discriminate against transient noise bursts that are salient part of a submarine-platform noise, thus reducing the probability of false alarms.

Still another object of this invention is to combine the measurement of the bearing and the frequency information of an intercepted signal into a single processor in such a way that the output will be highly dependent on both the frequency stability and the bearing stability of the received acoustical signal.

Other objects, advantages and novel features of the invention will become apparent from the following detailed description of the invention when considered in conjunction with the accompanying drawings, wherein:

FIG. 1 is a block diagram of a prior art circuit for obtaining one omnidirectional and two directional signals from an intercepted acoustic signal;

FIG. 2 is a block diagram of means for obtaining the other omnidirectional signal by combining the two directional signals;

FIG. 5 is a frequency display of the intercepted acoustic signal; and

FIG. 6 is a frequency display of the intercepted acoustic signal.

Figure 3:
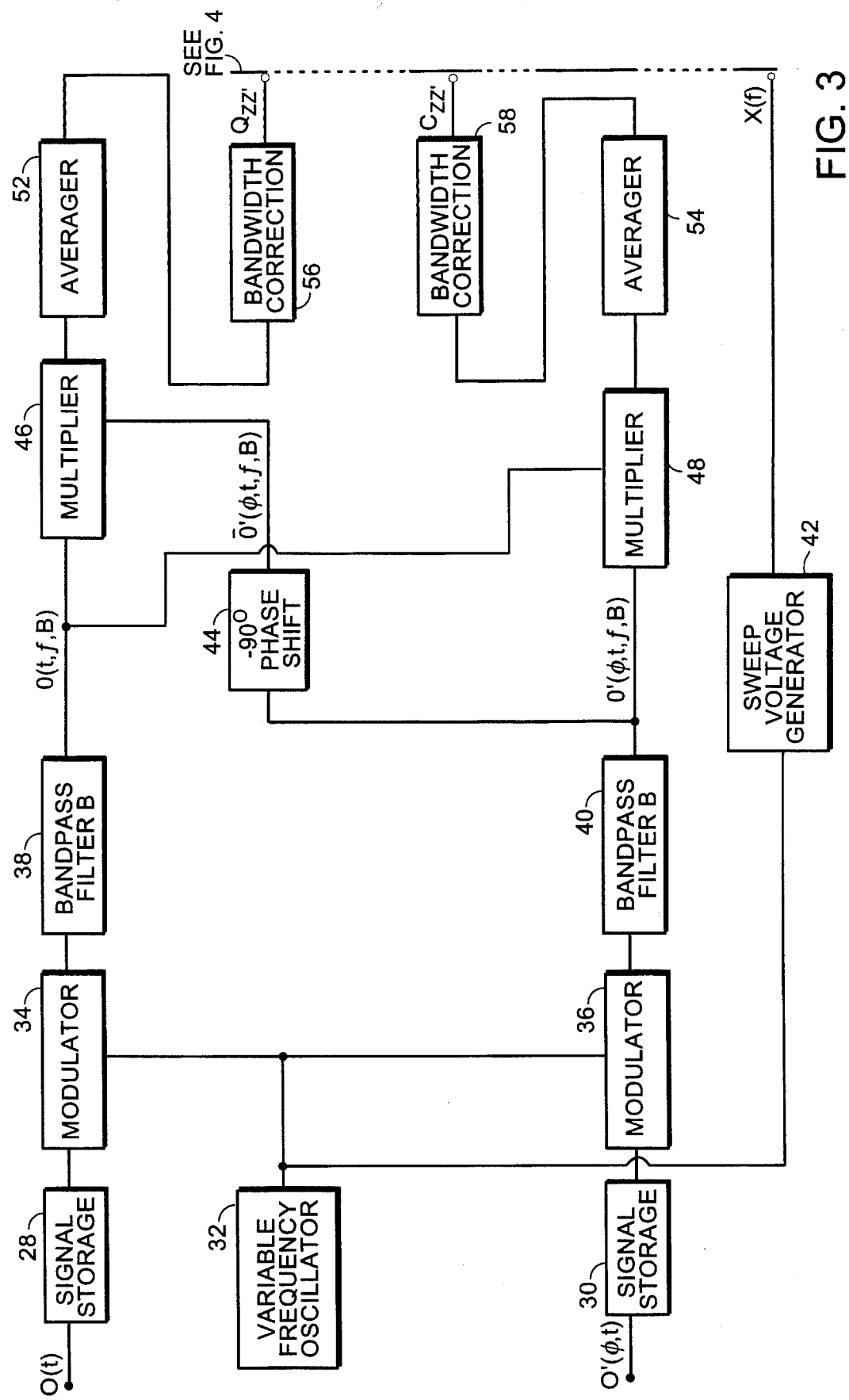
FIG. 3 is a block diagram of means for extracting the real and complex components of the cross-spectral density function of the two omnidirectional signals.

Referring to FIG. 1, a multimode hydrophone 10 is a right cylindrical hydrophone which is divided into four quadrants. Each quadrant generates an electrical signal responsive to a plane-wave acoustic signal. The four electrical signals; $Q_1$, $Q_2$, $Q_3$, and $Q_4$ are combined in a signal combining circuit 12 which comprises three subcircuits 14, 16, and 18. Subcircuits 14 and 16 combine the four electrical signals to form two directionals signals x(φ,t) and y(φ,t) and the subcircuit 18 combines the four electrical signals to form an omnidirectional signal O(t). It should be noted that individual components of the electronic circuits used in the preferred embodiment of the subject invention are conventional. Consequently, a detailed description of each such circuit is not set forth. As an example, circuit 12 comprises a plurality of conventional sum and difference amplifiers.

The directional signals x(φ,t) and y(φ,t) are phase shifted by −90° each through circuits 20 and 22 respectively to generate output signals $\bar{x}$(φ,t) and $\bar{y}$(φ,t). As shown in FIG. 2, the signal $\bar{x}$(φ,t) is phase shifted by +90° in circuit 23 and is then combined with the signal $\bar{y}$(φ,t) in a summing network 24 which generates another omnidirectional signal O'(φ,t) as its output.

As shown in FIG. 3 the two omnidirectional signals O(t) and O'(φ,t) are then stored in storing circuits 28 and 30 respectively, where from the sample data can be generated periodically for analyzing the frequency components of interest. A variable frequency oscillator 32 is used to modulate the signals of interest for analysis in modulating circuits 34 and 36. The output signals from the modulators 34 and 36 are filtered in narrow bandpass filters 38 and 40 respectively to select a certain frequency interval, Δf or B, of the whole spectrum of frequencies. The output of the variable frequency oscillator 32 is also used to trigger a sweep voltage generator 42 to generate a sweep signal X(f) for displaying frequency information of an intercepted acoustic signal.

The output of the bandpass filter 40 is phase-shifted by −90° in a phase shifter 44 so as to obtain a signal $\bar{O}$'(φ,t,f,B). The output O(t,f,B) of circuit 38 and the output $\bar{O}$'(φ,t,f,B) of circuit 44 are then multiplied in the multiplier circuit 46. The outputs O(t,f,B) and O'(φ,t,f,B) of circuits 38 and 40 respectively are multiplied in the multiplier circuit 48. The outputs O(t,f,B).$\bar{O}$'(φ,t,f,B) and O(t,f,B).O'(φ,t,f,B) of circuits 46 and 48 respectively are then averaged in averaging circuits 52 and 54 respectively to eliminate the ambient noise components present and thereby increase signal to noise ratio. The outputs of the averaging circuits 52 and 54 are then fed through bandwidth correction circuits 56 and 58 respectively; and the outputs of circuits 56 and 58 represent the magnitudes of real component $Q_{zz}'(f)$, quadrature spectral density function, and complex component $C_{zz}'(f)$, co-spectral density function, of the cross-spectral density function $S_{zz}'(f)$ of the functions O(t,f,B) and O'(φ,t,f,B).

Figure 4:
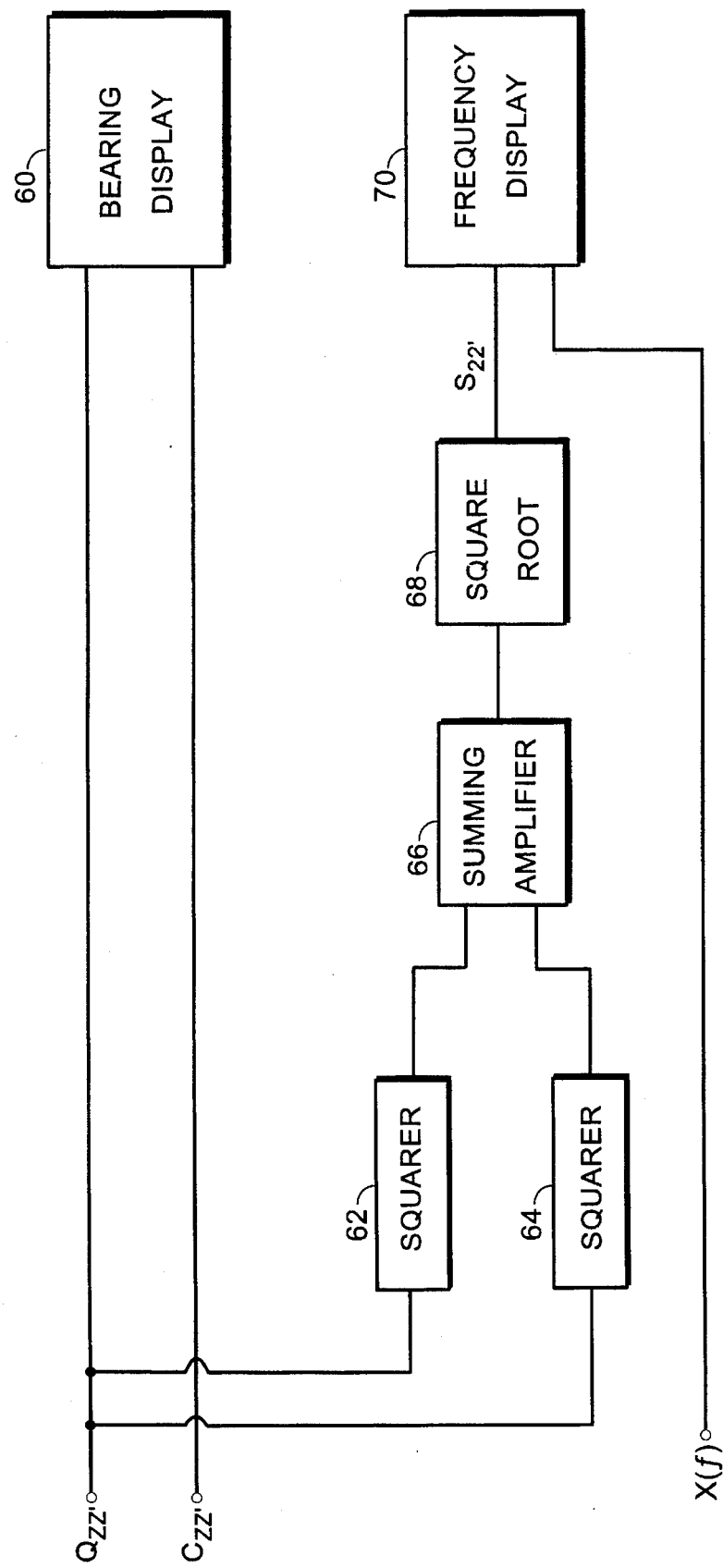
FIG. 4 is a block diagram of means for displaying the bearing and frequency information.

In FIG. 4 the outputs $Q_{zz}'(f)$ and $C_{zz}'(f)$ of the circuits 56 and 58 respectively are displayed in circuit 60 to extract the bearing information. The magnitude of the cross-spectral density function $S_{zz}'(f)$ is obtained by squaring $Q_{zz}'(f)$ and $C_{zz}'(f)$ in squaring circuits 62 and 64 respectively; and summing the outputs thereof in the summing amplifier 66. The output of the summing circuit 66 is fed into the square root circuit 68, the output of which represents the magnitude of $S_{zz}'(f)$. The magnitude of $S_{zz}'(f)$ is displayed in the frequency display circuit 70 using the sweep signal X(f) from the sweep voltage generator 42 for extracting the frequency information of the intercepted acoustic signal.

As shown in FIG. 5, the bearing information display 72 gives φ, the azimuth angle 74 which is the angle at which the intercepted signal arrives and is measured as the angle made by the radius vector 76, represented by r and proportional the magnitude of $S_{zz}'$, with the y-axis 78 in the clockwise direction.

As shown in FIG. 6 numeral 80 represents the frequency display wherein the horizontal axis 82 represents frequency spectrum and the vertical axis 84 represents the magnitude of $S_{zz}'$, one value of which is shown as a vertical line 86 and represented by l. The sweep signal X(f) from the sweep voltage generator 42 is used for the frequency display of FIG. 6.

As pointed out above, the cross-spectral density of the two omnidirectional signals O(t,f,B) and O'(t,f,B) is used for processing the acoustic signal to extract the bearing and frequency information thereof.

Analyzing the circuits, the two directional signals and the omnidirectional signal used as inputs to the processor as shown in FIGS. 1 and 2 are:

$$x(φ,t) = C(f) \cdot \sin φ \cdot S(t)$$

$$y(φ,t) = C(f) \cdot \cos φ \cdot S(t) \text{ and}$$

$$O(t) = R(f) \cdot S(t)$$

Assuming sinusoidal variations with time of the acoustic pressure wave representing the acoustic signal, i.e., $S(t) = s \cdot e^{j2\pi ft}$ where f is the frequency of the acoustic signal.

Phase shifting $\bar{x}$(φ,t) by +90° to get x(φ,t) and summing x(φ,t) with $\bar{y}$(φ,t) as shown in FIG. 2 gives O'(φ,t) as follows:

$$O'(φ,t) = \bar{y}(φ,t) + j\bar{x}(φ,t) \text{ where } j = \sqrt{-1} = e^{j\frac{\pi}{2}}$$

$$O'(φ,t) = C(f) \cdot \cos φ \cdot s \cdot e^{j2\pi ft} + jC(f) \cdot \sin φ \cdot s \cdot e^{j2\pi ft}$$

$$O'(φ,t) = C(f) \cdot s \cdot e^{j2\pi ft} [\cos φ + j \sin φ]$$

$$O'(φ,t) = C(f) \cdot s \cdot e^{j(2\pi ft+φ)}$$

Thus we have two omnidirectional signals, O(t), and O'(φ,t) having amplitudes independent of φ the azimuth angle of the acoustic signal, but they differ in phase by the angle φ.

The cross-spectral density function for a pair of time history records, e.g., O(t) and O'(φ,t) is the Fourier Transform of the cross-correlation function. Since a cross-correlation function is not an even function, the cross-spectral density function is generally a complex function and can be represented by its real and imaginary parts as follows:

$$S_{zz}'(f) = C_{zz}'(f) - JQ_{zz}'(f)$$

where $S_{zz}'(f)$ is the cross-spectral function $C_{zz}'(f)$ is the co-spectral density function, and $Q_{zz}'(f)$ is the quadrature spectral density function.

For a better understanding of this invention, the co-spectral density function and quadrature spectral density function are defined in terms of narrow-band filtering. The co-spectral density function can be thought of as the average of the product of O(t) and O'(t,φ) within a narrow frequency interval Δf or B between f and f+Δf divided by the frequency interval. The quadrature spectral density function y the average of the product of O(t) and $\bar{O}$'(φ,t), the 90° phase shifted O'(t,φ) or vice versa. Thus $$C_{zz}'(f) = \lim_{B \to 0} \lim_{T \to \infty} \frac{1}{(B)T} \int_0^T O(t,B)O'(φ,t,B)dt$$

-continued $$Q_{zz'}(f) = \lim_{B \to 0} \lim_{T \to \infty} \frac{1}{(B)T} \int_0^T \bar{O}(t,B)O'(\phi,t,B)dt$$

where $\bar{O}'(\phi,t,B)$ denotes a 90° phase shift from $O'(\phi,t,B)$.

It is convenient to express the cross-spectral density function in complex polar notation such that $$S_{zz'}(f) = |S_{zz'}(f)| e^{j\theta_{zz'}(f)}$$

where $|S_{zz'}(f)| = \sqrt{C_{zz'}^2(f) + Q_{zz'}^2(f)}$ and $$\theta_{zz'}(f) = \tan^{-1}\left[\frac{Q_{zz'}(f)}{C_{zz'}(f)}\right]$$

If the 90° phase shift is inserted in $O'(\phi,t)$ properly, $\theta_{zz'}'(f)$ will be equal to $\phi$, the angle of azimuth at which the acoustic signal arrived. The frequency content of the acoustic signal will be completely contained in $|S_{zz'}'(f)|$.

Thus an intercepted acoustic signal energizes a right cylindrical hydrophone generating electrical signals which are combined and processed in the circuit provided therefor, to extract simultaneously the bearing and frequency information of the acoustic signal in the presence of undesirable background noise.

It will be understood that various changes in the details, materials, and arrangements of parts (and steps), which have been herein described and illustrated in order to explain the nature of the invention, may be made by those skilled in the art without departing from the principle and scope of the subject invention as expressed in the appended claims.

I claim:

1. A signal processor for obtaining bearing and frequency information of a plane-wave acoustical signal comprising:

a hydrophone for generating a plurality of electrical signals responsive to such acoustical signal;

means for combining said electrical signals into a first omnidirectional signal and two spatially orthogonal directional signals containing the frequency and bearing information;

means for combining the two directional signals to form a second omnidirectional signal; and a circuit for extracting said bearing and frequency information from the first and second omnidirectional signals.

2. The processor of claim 1 wherein the circuit for extracting said bearing and frequency information from the first and second omnidirectional signals comprises:

a first modulator to modulate the first omnidirectional signal;

a second modulator to modulate the second omnidirectional signal;

a variable frequency oscillator for providing signal to the first and second modulators;

a sweep voltage generator receiving signals from the variable frequency oscillator and producing a sweep signal in response thereto, for displaying the bearing and frequency information;

a first bandpass filter for filtering the first modulated omnidirectional signal for a narrow bandwidth;

a second bandpass filter for filtering a second modulated omnidirectional signal for the narrow bandwidth;

a first phase shifting circuit for introducing a phase shift of substantially 90° in one of the modulated and filtered omnidirectional signals;

a second multiplier for multiplying the phase shifted, modulated, and filtered omnidirectional signal and the other modulated and filtered omnidirectional signal;

a first averager for averaging the output of the first multiplier;

a second averager for averaging the output of the second multiplier;

a first bandwidth correction circuit for correcting the output of the first averager;

a second bandwidth correction circuit for correcting the output of the second averager;

a first squaring circuit for squaring the output of the first bandwidth correction circuit;

a second squaring circuit for squaring the output of the second bandwidth correction circuit;

a summing amplifier for summing the outputs of the first and second squaring circuits;

a square rooting circuit for square rooting the output of the summing amplifier;

means for displaying the outputs of the first and second bandwidth correction circuits for obtaining the bearing information of the acoustical signal; and means for displaying the output of the square rooting circuit using the sweep signal of the sweep voltage generator.

3. The processor of claim 2, wherein the hydrophone for generating the electrical signals responsive to the acoustical signal, is a right cylindrical hydrophone divided into four quadrants, each quadrant generating one of the four electrical signals.

4. The processor of claim 3 wherein the means for combining the two directional signals forming a second omnidirectional signal comprises:

a second phase shifting circuit for introducing a phase difference of substantially 90° in one of the two directional signals and a summing network for combining the phase shifted directional signal with the other directional signal, thereby forming the second omnidirectional signal.

5. A method for obtaining frequency and bearing information of an acoustical signal comprising:

generating four electrical signals in response to an acoustical signal;

combining the four electrical signals, forming two directional signals and a first omnidirectional signal;

combining the two directional signals into a second omnidirectional signal; and then extracting the frequency and bearing information of the acoustical signal.

6. The method of claim 5, wherein the extracting step comprises:

modulating the two directional signals by signals from a variable frequency oscillator;

filtering each of the two directional signals through a bandpass filter;

phase shifting one of the two filtered signals by substantially 90°;

then multiplying the two filtered omnidirectional signals in a first multiplier;

multiplying one of the filtered omnidirectional signals and the phase shifted omnidirectional in a second multiplier;

averaging the output of the first multiplier in a first averaging circuit;

averaging the output of the second multiplier in a second averaging circuit;

correcting the output of the first averaging circuit in a first bandwidth correction circuit;

correcting the output of the second averaging circuit in a second bandwidth correction circuit;

displaying the outputs of the two bandwidth correction circuits in a bearing display circuit for obtaining the bearing information;

squaring the output of the first bandwidth correction circuit in a first squaring circuit;

squaring the output of the second bandwidth correction circuit in a second squaring circuit;

summing the outputs of the two squaring circuits in a summing amplifier;

taking the square root of the output of the summing amplifier in a square root circuit;

generating a sweep signal by a sweep voltage generator triggered by the variable frequency oscillator; and displaying output of the square root circuit in a frequency display circuit using the sweep signal from the sweep voltage generator for obtaining the frequency information of the acoustical signal.

* * * * *